455-617 AU 233 EX
FIP8106 OR 3,657,543

United States Patent [15] 3,657,543

Rose [45] Apr. 18, 1972

[54] OPTICAL COMMUNICATIONS SYSTEM WITH IMPROVED BIAS CONTROL FOR PHOTOSENSITIVE INPUT DEVICE

[72] Inventor: Edward A. Rose, Cupertino, Calif.

[73] Assignee: Optronix, Inc., Santa Clara, Calif.

[22] Filed: July 24, 1968

[21] Appl. No.: 747,383

[52] U.S. Cl. ....... 250/199, 329/144

[51] Int. Cl. ....... H04b 9/00

[58] Field of Search ....... 250/199; 329/144; 330/59; 307/88.3

[56] References Cited

UNITED STATES PATENTS

| | | | |
|---|---|---|---|
| 2,858,421 | 10/1958 | Touvet | 250/199 |
| 3,379,888 | 4/1968 | Rossoff | 250/199 |

*Primary Examiner*—Robert L. Griffin
*Assistant Examiner*—Albert J. Mayer
*Attorney*—Jerald E. Rosenblum

[57] ABSTRACT

An optical communications system in which a subcarrier is impressed on an optical beam with a modulation representative of a signal to be communicated. This beam is intercepted by a semiconductor device having a photo-sensitive junction which generates an electrical signal representative of the modulated subcarrier and applies this signal to a demodulator for detecting the transmitted signal. A tuned circuit resonant at the subcarrier frequency is interposed between the semiconductor device and the detector and serves as a rejection filter for frequencies which deviate from the subcarrier frequency by more than the bandwidth of the transmitted signal. A back bias is applied to the photo-sensitive junction of the semiconductor device through a low resistance path of the tuned circuit so that the back bias does not vary substantially with variations in the intensity of optical radiation intercepted by the semiconductor device.

8 Claims, 3 Drawing Figures

EDWARD A. ROSE
INVENTOR

BY J. Rosenblum
ATTORNEY

OPTICAL COMMUNICATIONS SYSTEM WITH IMPROVED BIAS CONTROL FOR PHOTOSENSITIVE INPUT DEVICE

BACKGROUND OF THE INVENTION

A back-biased semiconductor junction device may be used as a sensitive detector of optical radiation. When such a device is used as a transducer for generating an electrical signal representative of a signal-modulated subcarrier impressed on a received optical radiation beam, it has been found necessary to satisfy the following requirements:

1. Background fluctuations in the intensity of received optical radiation, occurring over a wide range of frequencies, must be eliminated from the detection system; and
2. The back bias applied to the photo-sensitive junction must be maintained substantially constant in order to obtain high signal-to-noise ratio operation over a large dynamic range of average received radiation intensity.

Previously available circuits for such semiconductor devices have not permitted satisfactory realization of both of these operating requirements.

SUMMARY OF THE INVENTION

According to the present invention, a tuned circuit, resonant at the frequency of the signal-modulated subcarrier impressed on an incoming optical radiation beam, is interposed between the photo-sensitive semiconductor device intercepting the beam and the circuit for detecting the signal carried by the subcarrier, said tuned circuit serving to reject noise due to optical intensity fluctuations outside the bandwidth of the received signal while permitting the back bias to be applied to the semiconductor device through a low resistance path such that said back bias does not vary substantially with fluctuations in the intensity of the intercepted optical radiation.

DESCRIPTION OF THE DRAWING

The various features and advantages of the present invention will become more apparent upon a consideration of the following description taken in connection with the accompanying drawing, wherein.

DESCRIPTION OF THE PREFERRED EMBODIMENT

Figure 1:
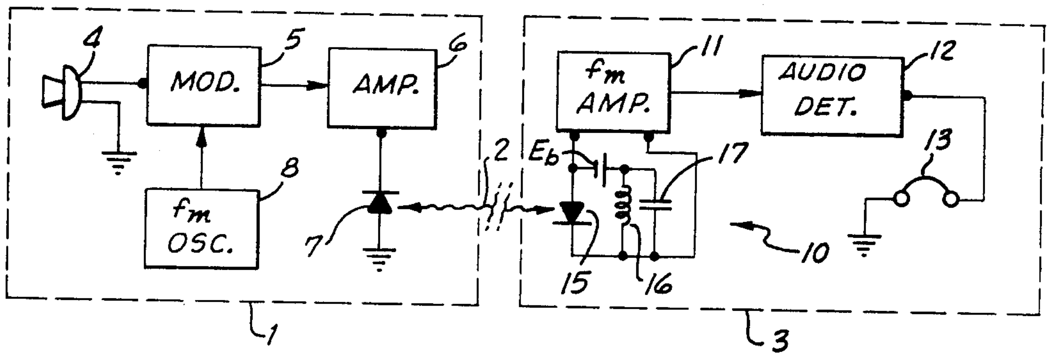
FIG. 1 is a schematic block diagram of a communications system in accordance with the present invention.

Referring to FIG. 1, an optical transmitter unit 1 generates a beam of radiation 2 which is intercepted and detected by a receiver unit 3. This communications system may be used in various configurations well known in the art. For example, a transceiver instrument may contain a transmitter unit 1 with an integrally packaged receiver unit 3 whereby two such instruments may be used for bilateral line-of-sight communication.

In the transmitter 1, a microphone or other signal source 4 generates a signal which it is desired to communicate. This signal is applied via a modulator unit 5 and an amplifier 6 to a transducer 7 which generates the optical beam 2 with an intensity proportional to the output of the modulator 5. In this particular example, the transducer 7 is an optically emissive diode which typically emits a beam in the near-infrared region of the optical spectrum. However, any other known device may be used for generating the beam 2 in any desired portion of the ultraviolet, visible or infrared regions of the optical spectrum.

In accordance with the present invention, the transmitter unit 1 includes a modulation oscillator 8 which generates a signal at a frequency $f_m$ which is higher than the frequency associated with the signal source 4. Accordingly, the output of the modulator 5 consists of a carrier signal at the frequency $f_m$ modulated by the signal of the signal source 4, and the optical beam 2 has this modulated $f_m$ signal impressed thereon as a subcarrier. The receiver 3 comprises a detection circuit 10 which transduces the modulated $f_m$ signal of the intercepted beam 2 to an electrical signal which is then amplified by a bandpass amplifier 11 and demodulated by a detector 12 to recover the signal of source 4, in the audio or other signal frequency range, said signal being then fed to earphones or other suitable signal utilization device 13.

The transducing element in the detection circuit 10 is a photo-sensitive diode or other semiconductor junction device 15 which has a back bias $E_b$ applied across the photo-sensitive junction thereof. The output of the semiconductor device 15 is filtered by a resonant circuit consisting of the parallel of an inductance 16 and a capacitance 17 tuned to the carrier frequency $f_m$. The rejection properties of the tuned circuit 16, 17 greatly enhances the signal-to-noise ratio of the detected signal, since the input to the amplifier 11 has a peaked response at the carrier frequency $f_m$, and the bandpass of the amplifier 11 is only wide enough to accommodate the frequency range of the source 4 while rejecting background noise outside of this bandpass region. This noise limiting bandpass reduces the noise into the detector 12, thereby minimizing noise due to any non-linearities in said detector.

Figure 2:
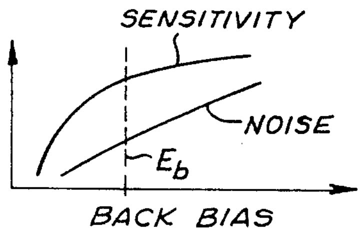
FIG. 2 is a plot of a sensitivity vs. back bias curve and a noise vs. back bias curve for the semiconductor transducer element in the receiver of the communications system of FIG. 1.

An important feature of the present invention is the fact that the d-c biasing circuit for the transducer 15 consists of the biasing voltage source $E_b$ in series with the transducer 15 and the inductor 16 of the tuned circuit. The transducer 15 functions as a current source, the output of which is proportional to the average intensity of the received optical beam 2. Accordingly, the existence of resistance in the biasing circuit would give rise to a voltage drop generated by the flow of the radiation-responsive current through such resistance, whereby variations in received radiation intensity would result in changes in the magnitude of the back bias applied across the photo-sensitive junction of the transducer 15. FIG. 2 illustrates curves of the detection sensitivity and internally generated noise, respectively, of a typical junction transducer 15 as a function of back bias applied across the photo-sensitive junction of the transducer. A desirable operating value of the back bias $E_b$ (dashed line) is selected to optimize the ratio of sensitivity-to-noise. As can readily be seen from FIG. 2, an increase in the back bias from this optimum value results in a relatively small increase in sensitivity and a relatively large increase in noise, whereas a decrease from this optimum value results in a relatively small decrease in noise and a relatively large decrease in sensitivity. Thus maintenance of the back bias at substantially the optimum value $E_b$ is a critical requirement for operation of the receiver 3 at a high signal-to-noise ratio over a large dynamic range of average received radiation intensity (including both the received beam radiation and the received background radiation). In the detection circuit 10 of the present invention, the only such biasing circuit resistance is that which is associated with the inductance 16, and this resistance is in practice sufficiently small that the back bias of the transducer 15 is maintained within the critical limits over an extremely wide dynamic range of received beam intensity. For example, in a typical circuit, the received intensity may vary over a dynamic range of $10^4$, by virtue of changes in both signal and background radiation, with a change in the junction back bias of less than one-half volt.

Figure 3:
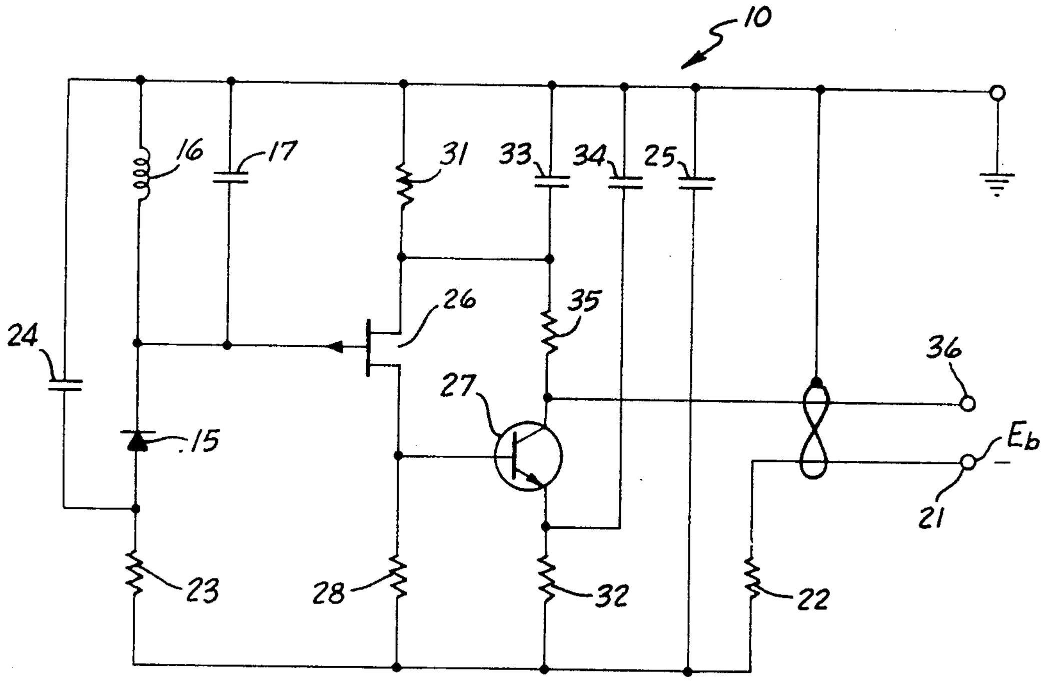
FIG. 3 is a detailed schematic diagram of a transducer circuit for use in the receiver of the communications system of FIG. 1.

A detailed circuit diagram for the radiation detector 10 in the receiver unit 3, including a two-stage preamplifier, is shown in FIG. 3. The back bias $E_b$ is applied via a terminal 21 and coupling resistor 22 to the photo-sensitive semiconductor device 15. A filtering network comprising a resistor 23 and capacitors 24 and 25 provides a high frequency by-pass for noise fluctuations in the bias voltage power supply. The signal-modulated carrier at the frequency $f_m$, generated by the semiconductor device 15 in response to the incident beam 2, is resonated in the tuned circuit 16, 17 and successively amplified by a high input impedance field effect transistor amplifier 26 and a low output impedance NPN transistor amplifier 27, said amplifiers being coupled via a load resistor 28. The amplifiers 26 and 27 are provided with conventional d-c biasing resistors 31 and 32 and isolation capacitors 33 and 34. The output of the amplifier 27 is developed across a load resistor 35 connected to the output terminal 36 which provides the output modulated carrier signal $e_o$ which is then applied to the bandpass amplifier 11 as previously described with reference to FIG. 1. The high input impedance of the first stage amplifier 26 serves to avoid parasitic oscillations, and the low output impedance of the second stage amplifier 27 isolates the circuit 10 from changes in the loading applied to the output terminal 36.

In the preferred mode of operation, the modulation oscillator 8 is of sufficient amplitude to extinguish the optical emission of the transducer 7 during one-half of each cycle whereby the output beam 2 is pulsed at the carrier frequency $f_m$ and corresponding pulses are generated by the detector transducer 15. The tuned circuit 16 and 17 serves to transform these pulses into a sinusoidal wave form at the carrier frequency $f_m$, thereby simplifying the subsequent amplification and detection operations. In general, by use of appropriate well-known modulation and demodulation circuits, the communication system of the present invention may be used with either amplitude modulation, frequency modulation, or pulse code modulation of the $f_m$ subcarrier component of the optical beam 2.

I claim:

1. In a receiver for detecting a signal modulated on a subcarrier of an optical beam, the combination comprising: a semiconductor device having a photo-sensitive junction adapted to intercept said beam and generate an electrical signal representative of said modulated subcarrier; means for detecting said generated signal; a tuned circuit resonant at the frequency of said subcarrier coupled to said semiconductor device and said detecting means; means for applying a back bias to the photo-sensitive junction of said semiconductor device through a low resistance path of said tuned circuit; means for coupling said tuned circuit in series with said bias applying means; means for coupling said semiconductor device in parallel with the series combination of said bias applying means and said tuned circuit; and means for coupling said detector in parallel with the series combination of said bias applying means and said tuned tank circuit so that said back bias does not vary substantially with variations in the intensity of optical radiation intercepted by said semiconductor device.

2. The combination of claim 1 wherein said tuned circuit comprises the parallel combination of an inductance and a capacitance, said inductance providing said low resistance path for application of the back bias to the photo-sensitive junction of said semiconductor device.

3. The combination of claim 1, further comprising a preamplifier for amplifying said modulated subcarrier signal generated by said semiconductor device, said preamplifier comprising, in successive stages, a high input impedance amplifier and a low output impedance amplifier.

4. The combination of claim 1 including a filter circuit for by-passing fluctuations of the back bias supply from said detecting means.

5. An optical communications system, comprising: means for generating an optical beam; means for impressing a subcarrier on said optical beam; means for modulating a signal on said subcarrier; a semiconductor device having a photo-sensitive junction adapted to intercept said beam and generate an electrical signal representative of said modulated subcarrier; means for detecting said generated signal; a tuned circuit resonant at the frequency of said subcarrier coupled to said semiconductor device and said detecting means; means for applying a back bias to the photosensitive junction of said semiconductor device through a low resistance path of said tuned circuit; means for coupling said tuned circuit in series with said bias applying means; means for coupling said semiconductor means in parallel with the series combination of said bias applying means and said tuned circuit; and means for coupling said detector in parallel with the series combination of said bias applying means and said tuned tank circuit so that said back bias does not vary substantially with variations in the intensity of optical radiation intercepted by said semiconductor device.

6. An optical communications system according to claim 5 wherein said tuned circuit comprises the parallel combination of an inductance and a capacitance, said inductance providing said low resistance path for application of the back bias to the photo-sensitive junction of said semiconductor device.

7. An optical communications system according to claim 6 wherein said subcarrier impressing means pulses the intensity of said optical beam so that said semiconductor device generates pulses at the frequency of said subcarrier, and said tuned circuit transforms said pulses into a sinusoidal signal at said subcarrier frequency.

8. An optical communications system, comprising: means for generating an optical beam; means for impressing a subcarrier on said optical beam; means for modulating a signal on said subcarrier; photo-sensitive means adapted to intercept said beam for generating an electrical signal representative of said modulated subcarrier; means coupled to said photo-sensitive means for back-biasing said photo-sensitive means through a low resistance circuit; means for detecting said generated signal; a tuned circuit resonant at the frequency of said subcarrier with a bandpass about said subcarrier frequency coupled to said photo-sensitive means and said detecting means; means for coupling said tuned circuit in series with said bias applying means; means for coupling said photo-sensitive means in parallel with the series combination of said bias applying means and said tuned circuit; and means for coupling said detector in parallel with the series combination of said bias applying means and said tuned tank circuit whereby noise outside of said bandpass is rejected from said detecting means.

* * * * *